United States Patent
Huber et al.

(10) Patent No.: US 7,099,450 B1
(45) Date of Patent: Aug. 29, 2006

(54) SYSTEM AND METHOD FOR THE TRANSFER OF AN EXISTING LOGICAL DATA LINK

(75) Inventors: Manfred Huber, Krailling (DE); Cornel Klein, Oberhaching (DE)

(73) Assignee: Siemens Aktiengesellschaft, Munich (DE)

( * ) Notice: Subject to any disclaimer, the term of this patent is extended or adjusted under 35 U.S.C. 154(b) by 1155 days.

(21) Appl. No.: 10/049,273

(22) PCT Filed: Aug. 4, 2000

(86) PCT No.: PCT/DE00/02611

§ 371 (c)(1),
(2), (4) Date: Feb. 11, 2002

(87) PCT Pub. No.: WO01/11902

PCT Pub. Date: Feb. 15, 2001

(30) Foreign Application Priority Data

Aug. 10, 1999 (DE) .............................. 199 37 710

(51) Int. Cl.
*H04M 3/42* (2006.01)
*H04M 1/56* (2006.01)

(52) U.S. Cl. ..................... 379/211.01; 379/202.01; 379/142.05

(58) Field of Classification Search ........... 379/211.01, 379/211.02, 212.01, 243, 268, 270, 93.21, 379/142.05, 158, 202.01

See application file for complete search history.

(56) References Cited

U.S. PATENT DOCUMENTS 5,621,726 A * 4/1997 Murakimi ................... 370/255
5,675,583 A * 10/1997 Bales et al. ................. 370/261

FOREIGN PATENT DOCUMENTS

| DE | 42 01 031 | 9/1994 |
|---|---|---|
| EP | 0 655 873 A2 | 5/1995 |
| EP | 0 661 897 A1 | 7/1995 |
| EP | 0 669 773 A2 | 8/1995 |
| EP | 0 886 420 A2 | 12/1998 |
| GB | 2 323 745 A | 9/1998 |
| JP | 09051314 | 2/1997 |
| WO | WO 98/57501 | 12/1998 |
| WO | WO 99/49717 | 10/1999 |

* cited by examiner

*Primary Examiner*—William J. Deane, Jr.
(74) *Attorney, Agent, or Firm*—Morrison & Foerster LLP

(57) ABSTRACT

An existing logical data link between a first subscriber terminal connected to a subscriber line of a telecommunications network and a switching center of the telecommunications network is transferred from a first subscriber terminal to a second subscriber terminal which is connected to the subscriber line of the first subscriber terminal or to another subscriber line of the second telecommunications network. The second subscriber terminal receives a message sent from the first subscriber terminal concerning the communication state of the existing logical data link and takes over this data link in the reported communication state, adapting its own state.

7 Claims, 5 Drawing Sheets

FIG 5

SYSTEM AND METHOD FOR THE TRANSFER OF AN EXISTING LOGICAL DATA LINK

CLAIM FOR PRIORITY

This application claims priority to International Application No. PCT/DE00/002611 which was published in the German language on Aug. 4, 2000.

TECHNICAL FIELD OF THE INVENTION

The invention relates to a method for the transfer of an existing logical data link, and in particular, to a logical data link existing between a first subscriber terminal connected to a subscriber line of a telecommunications network and a switching center of the telecommunications network.

BACKGROUND OF THE INVENTION

Figure 1:
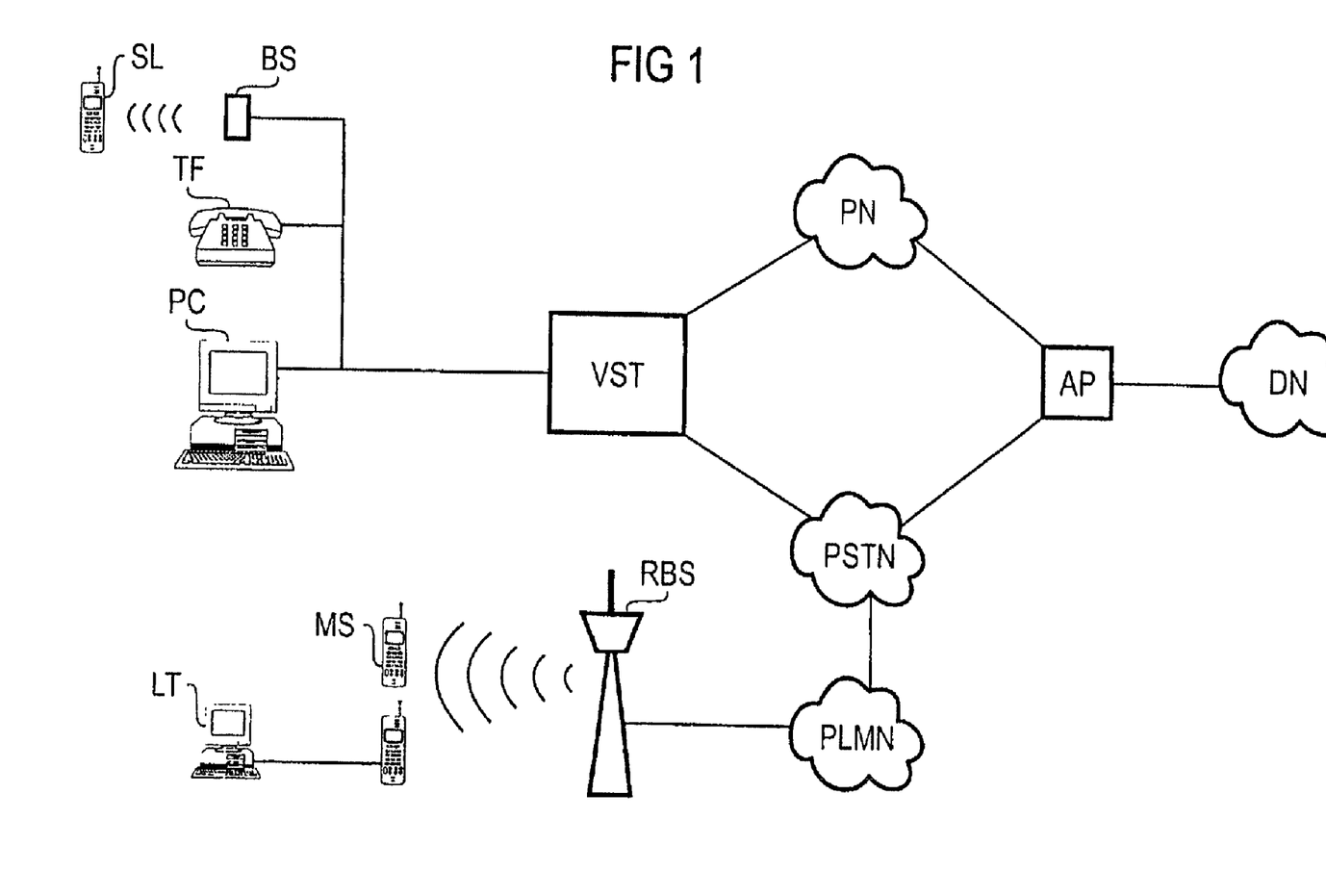
FIG. 1 shows an exemplary network constellation to which the method according to the invention can be applied.

A telecommunications network of this type is illustrated by way of example in FIG. 1. In FIG. 1, the telecommunications network is connected to an access computer AP of a data network DN, e.g. the Internet. Various subscriber terminals, e.g. a personal computer PC, a corded telephone TF and a cordless handset SL with its base station BS, are connected to a switching center VST. The switching center has a connection to the access computer AP of the data network DN via a circuit-switched public telephone network PSTN or via a packet-switched data network PN, e.g. X.25. At the same time, the public telephone network is connected to a mobile communications network PLMN which encompasses a plurality of radio devices RBS for connecting a plurality of subscriber terminals via a radio interface. Such subscriber terminals are, for example, mobile stations MS. It is also possible for a laptop LT or a personal computer to be connected to one of the indicated mobile stations via a serial interface, or for a mobile station to be integrated in a laptop or personal computer.

Given a network constellation of this type, the situation is currently as follows: A subscriber of the telecommunications network has various subscriber terminals, for example as illustrated in FIG. 1, which enable access to a data network, e.g. the Internet. Accordingly, with his subscriber terminal having display screen, e.g. TF, the subscriber can receive, read and process electronic mail (email) from the data network. It is assumed that the subscriber has established a data link to the data network with such a subscriber terminal in order to send his electronic mail from a so-called mail server, (not shown in FIG. 1) of the data network to his subscriber terminal. However, large items of electronic mail received which contain, for example, attachments in the format of PC applications (e.g. Word) cannot be displayed on the subscriber terminal, e.g. TF, because of the relatively small display and the low memory capacity. The subscriber therefore would like to use his personal computer to read such electronic mail. Hence, the subscriber must either establish a further data link (e.g. by using the second B-channel in the case of an ISDN connection) or a new data link to the access computer of the data network. Authorization must be obtained again, by typing in a password for example, the respective PC application must be activated for reading electronic mail on his PC, and the appropriate electronic mail with the attachment for displaying on the screen of the personal computer must be selected. If the subscriber then switches off the personal computer and would like to continue processing further electronic mail on his telephone with display, he must repeat the procedure set out above.

Also, in the case of Internet applications other than electronic mail, such as the accessing of provider pages with the aid of a so-called browser for example, the subscriber must proceed in a similar manner to reach the same state on his personal computer as was previously present on his telephone. That is, for example the same provider page accessed, the same state of transactions already made, such as a file transfer for example, the same bookmarks etc.

A procedure of this type is disadvantageous for at least the following reasons:

The establishment of a further or a new data link requires renewed authorization of the user, for example by entering passwords, and the selection of the access computer to be dialed.

The renewed connection establishment is in itself time-consuming since it is necessary to assign a new data network address (IP address) to the subscriber terminal (the personal computer in the example) for an Internet session, for which the so-called PPP (point-to-point) protocol is preferably used. Moreover, the communication partners of the data link must agree on transmission parameters, such as transmission bandwidth and quality for example, and also exchange authorization data again.

SUMMARY OF THE INVENTION

In one embodiment of the invention, there is a method for the transfer of an existing logical data link between a first subscriber terminal connected to a subscriber line of a telecommunications network and a switching center of the telecommunications network from the first subscriber terminal to a second subscriber terminal which is connected to the subscriber line of the first subscriber terminal or to another subscriber line of the telecommunications network. The first subscriber terminal sends a message concerning the communication state of the existing logical data link to the second subscriber terminal and takes over the data link in the reported communication state, adapting its own state. The communication state refers to agreements between the communication partners of the logical data link that have already been "negotiated" during connection establishment or in the course of the data link. The communication state also refers to states relating to activated applications and device settings of the first subscriber terminal.

The message concerning the communication state may include, for example, the assigned data network address of the first subscriber terminal and/or information about the transmission bandwidth and/or information about a reserved quality and/or authorization information and/or application settings information and/or information about the state of the applications activated in the first subscriber terminal and/or synchronization information for one or more data communication devices present in the subscriber terminal. The second subscriber terminal adapts its own state to the communication state. It thus takes the place of the first subscriber terminal. In addition, it sets its applications in accordance with the application settings of the first subscriber terminal, such as address books or bookmarks on Internet pages for example, and at the same time activates the applications that correspond to the applications of the first subscriber terminal. If, for example, an Internet browser or a word processing program is activated on the first subscriber terminal, then an Internet browser or a corresponding word processing program, e.g. Word, is therefore likewise launched on the second subscriber terminal.

In connection with the situation illustrated above, in which a subscriber has a first subscriber terminal, in the form of a telephone with display for example, and a second subscriber terminal, e.g. a PC, on his subscriber line, the method according to the invention represents a particularly favorable solution. For reading large items of electronic mail the subscriber can transfer the logical data link to his personal computer. The respective electronic mail which the subscriber had previously selected on the telephone is immediately displayed on the screen of the personal computer using a corresponding application. No interactions are required on the part of the subscriber. Transmission properties of the data link, such as transmission bandwidth or a reserved quality for example, are also retained. Settings in applications in the second subscriber terminal, such as address books for example, are also synchronized with those of the first subscriber terminal. The same advantages are conferred if the subscriber wishes to transfer back the transferred logical data link from the second subscriber terminal to the first subscriber terminal again.

In another embodiment of the invention, the method is applied to the case where the first subscriber terminal and the second subscriber terminal are connected to different subscriber lines. For example, if the telephone of the subscriber is installed in the house and the personal computer is installed in the office of the subscriber. It is therefore possible to transfer an existing logical data link between the subscriber terminal at home and the access computer of the data network to the personal computer of a trusted colleague in the office.

In one aspect of the invention, the telecommunications network comprises at least one fixed network and/or at least one mobile network. Accordingly, a logical data link that exists between a mobile station of the mobile network and the data network can be transferred to a second subscriber terminal, e.g. a personal computer, which is connected to a subscriber line of the fixed network, and vice versa. A personal computer can also be connected directly to the mobile station and can take over the existing data link. The method according to the invention can therefore be used on different types of network.

Another aspect of the invention relates to message exchange between the first subscriber terminal and the second subscriber terminal, which both belong to a digital, preferably an ISDN, subscriber line. Messages are exchanged in such a way that one of the subscriber terminals (T1,T2) sends a message addressed to the other terminal to the network termination of the subscriber line, and the latter passes said message both back in the direction of the other subscriber terminal and forward in the direction of the switching center, which on receiving said message either ignores or processes it. For this purpose the signaling protocol need only be modified slightly so that the switching center can ignore or evaluate the message received.

In still another aspect of the invention, the logical data link is transferred from a first analog subscriber terminal to a second analog subscriber terminal which is connected to the analog subscriber line of the first subscriber terminal, and when the logical data link is taken over the connection previously established by the first subscriber terminal between the subscriber line and the aforesaid switching center of the telecommunications network is maintained. By dispensing with a new establishment of a connection between the subscriber line and the switching center which is necessary for transferring the existing logical data link, above all resources in the network and time are saved, and repeated interactions of the subscriber, for example through repeated typing in of his password, are avoided.

Yet another aspect of the invention includes that after transmission of the message concerning the communication state, a suspension of data transmission on the data link is initiated by the first subscriber terminal and once the logical data link has been taken over the resumption of data transmission is initiated by the second subscriber terminal. This minimizes the loss of data which would normally lead to a repeated transmission of the lost data, resulting in reduced transmission bandwidth.

To avoid new establishment of the connection between the switching center and the subscriber line, according to another aspect of the invention, the logical link is maintained during the aforesaid suspension phase.

BRIEF DESCRIPTION OF THE DRAWINGS

An exemplary embodiment of the invention is explained below in greater detail with reference to a drawing, in which.

DETAILED DESCRIPTION OF THE PREFERRED EMBODIMENTS

Figure 2:
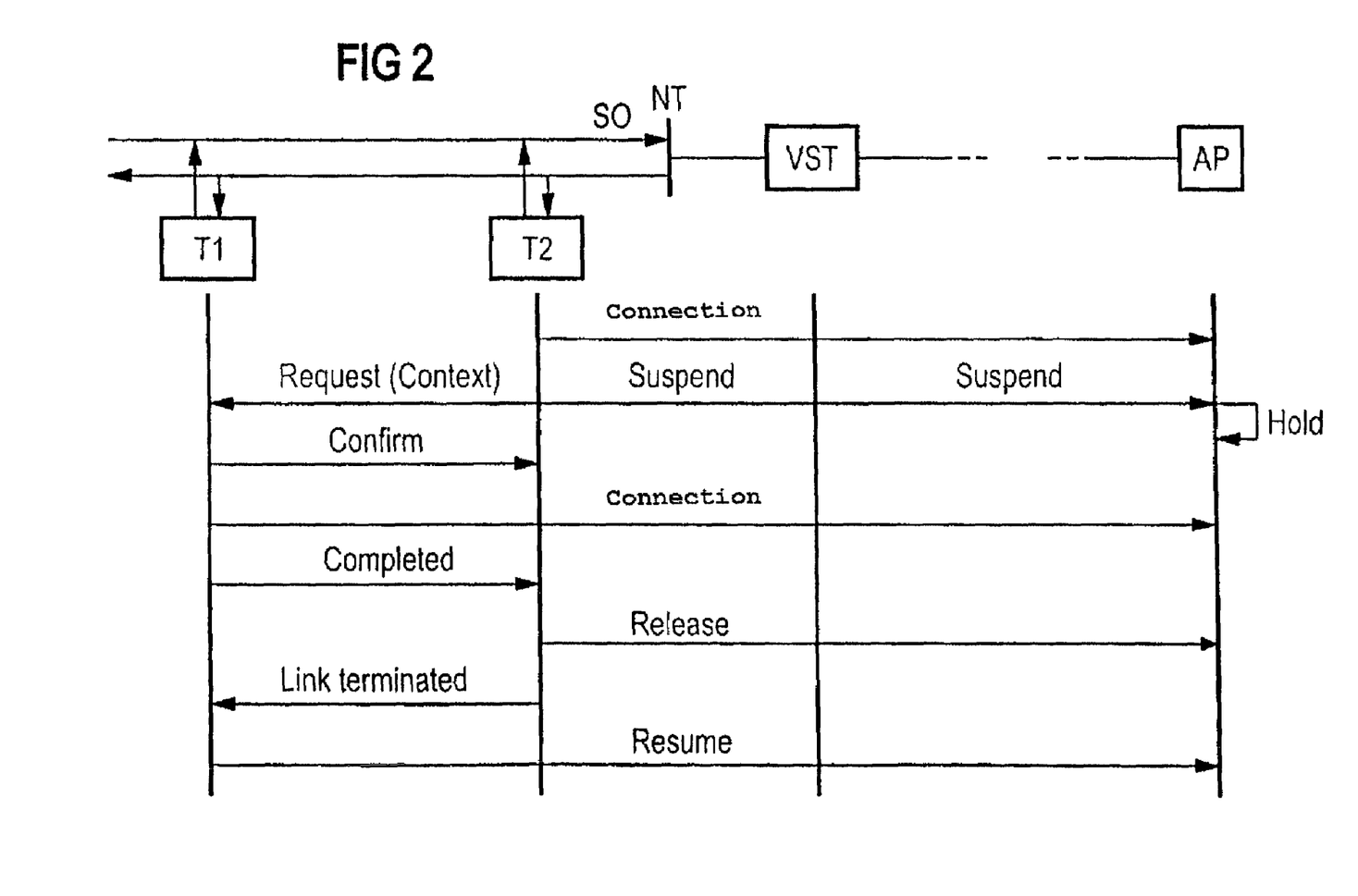
FIG. 2 shows a flow diagram of the method according to the invention in which two subscriber terminals are connected to the S0 bus of an ISDN subscriber line.

FIG. 2 represents an ISDN subscriber line in which the subscriber terminals, e.g. T1 and T2, are connected in parallel to a so-called S0 bus which terminates at the network termination NT schematically indicated in the figure. From the network termination NT, a subscriber line leads to the switching center VST of the public telephone network. The switching center has a connection to an access computer AP of a data network. The connection may be of various different types and is therefore indicated by a broken line in FIG. 2. For example, as described in FIG. 1, the connection may be established to the access computer AP via the public telephone network PSTN or via the No. 7 signaling network of the public telephone network, or via a packet-switched network, e.g. X.25. The access computer AP may also be integrated in the switching center VST. Various types of terminals are possible as subscriber terminals T1 and T2, e.g. a personal computer, a corded telephone with a display, or also a base station with a radio link to a cordless telephone.

In the example that follows, a subscriber has established a connection to the access computer of the data network with his subscriber terminal T1, e.g. a telephone with display. After retrieving his new electronic mail that has arrived at a mail server, he would like to read it and he notices that some electronic mail messages are very large. He would like to transfer this logical data link to his personal computer, e.g. T2. For this he presses a key on his telephone for example.

The subscriber terminal T1, i.e. the telephone, then sends a request message Request for transferring the logical data link including its communication state Context to the subscriber terminal T2.

The message can be transmitted using ISDN signaling. The signaling message, i.e. the request message Request, is sent to the network termination NT, which represents the interface to the S0 bus. The message is then sent back to the subscriber terminal T2 and forwarded to the switching center VST. The switching center can either accept this message as a so-called suspend message Suspend or simply ignore it. Said message Suspend can, as shown in the figure, be forwarded by the switching center to the access computer AP in order to signal the access computer to suspend data transmission on the logical data link but continue to maintain the data link. This suspended state of the access computer is indicated in FIG. 2 by Hold.

After receiving the request message Request including the communication state Context, the subscriber terminal T2 sends a confirmation message Confirm back to the subscriber terminal T1 in the manner described above.

Finally the subscriber terminal T2 establishes a new connection, indicated by "Connection" in FIG. 2, to the access computer. In doing so, in accordance with the communication state received, the subscriber terminal T2 sets the same device state as the subscriber terminal T1 had prior to transmission of the request message, and also the same connection state with respect to the data link that the connection between the subscriber terminal T1 and the access computer had prior to transmission of the request message. In other words, the subscriber terminal T2 assumes the agreements that the subscriber terminal T1 and the access computer AP had already "negotiated" during connection establishment. For example, if the so-called PPP protocol was used, a data network address, e.g. an IP address, was assigned to the subscriber terminal T1 when a connection was established from the access computer. The data network address is now assumed by the subscriber terminal T2. Using the information on the communication state received, the subscriber terminal T2 can also set the transmission bandwidth as well as a previously reserved quality, for example using the RSVP protocol commonly used on the Internet. Since the subscriber terminal T2 receives authorization information in the message concerning the communication state of the subscriber terminal T1, the subscriber is spared a new authorization procedure, for example through typing in passwords.

The subscriber terminal T2 furthermore automatically launches corresponding applications, e.g. an Internet browser or software for reading and processing electronic mail, and performs settings in accordance with the communication state reported to it. In the case where the subscriber would like to read large electronic mail items, corresponding "electronic mail" software is activated on the subscriber terminal T2, i.e. the personal computer, and the desired electronic mail is immediately selected and displayed on the screen with the aid of a suitable editor. An appropriate PC application, e.g. "Word", is immediately activated for any attachments also sent. In the case of an Internet session using a browser, a corresponding browser is launched on the personal computer and the corresponding Internet page is activated, and corresponding transactions (e.g. file transfer) are performed. Once the subscriber terminal T2 has adapted itself in accordance with the reported communication state, it sends a message Completed to the subscriber terminal T1 with which it confirms that the connection establishment and appropriate adapting of its own state to the reported communication state have been successfully performed.

The subscriber terminal T1 then sends a message Release via the switching center in the direction of the access computer to terminate the existing connection. The subscriber terminal T1 signals the connection cleardown to the subscriber terminal T2 with a message Link terminated. Following this the subscriber terminal T2 can initiate resumption of data transmission with a message Resume to the access computer. After a defined period, the existing connection between the subscriber terminal T1 and the access computer AP can be cleared, once the subscriber terminal T1 has received the message Completed.

In the case where, after transmission of the transfer request and its confirmation, both B-channels of the ISDN subscriber line are occupied, the existing connection can initially be terminated, as described above, with the messages Release, Link terminated and Resume, and then a new connection can be established between the subscriber terminal T2 and the access computer. The communication state of the new connection and the subscriber terminal T2 is then adapted in accordance with the above description.

The following procedure, not represented in the figure, can be seen as an alternative to the method described above: the transfer of the logical data link is signaled by specific messages of higher protocol layers, e.g. PPP or MPPP (multi-point-to-point protocol). With the PPP protocol the subscriber terminal T2 is notified of a unique connection identifier previously agreed between the subscriber terminal T1 and the access computer AP in a message of the protocol concerning the communication state. The subscriber terminal then adapts its state to the reported state and takes over the connection indicated by the connection identifier.

With the MPPP protocol, the newly established connection between the subscriber terminal T2 and the access computer AP is combined with the existing connection between the subscriber terminal T1 and the access computer AP to form a so-called "multilink bundle". At the subscriber end one channel of the multilink bundle now terminates in the subscriber terminal T1, and the other channel in the subscriber terminal T2. To ensure unambiguous addressing of the connected subscriber terminals, the subscriber terminal T1 sends a "HandOverCompleted" message, not shown in the figure, to the subscriber terminal T2 once establishment of the new connection to the subscriber terminal T2 and adaptation of the communication state have been successfully completed. Following this, the subscriber terminal T1 clears its existing connection and sends a message Link terminated to the subscriber terminal T2.

Figure 3:
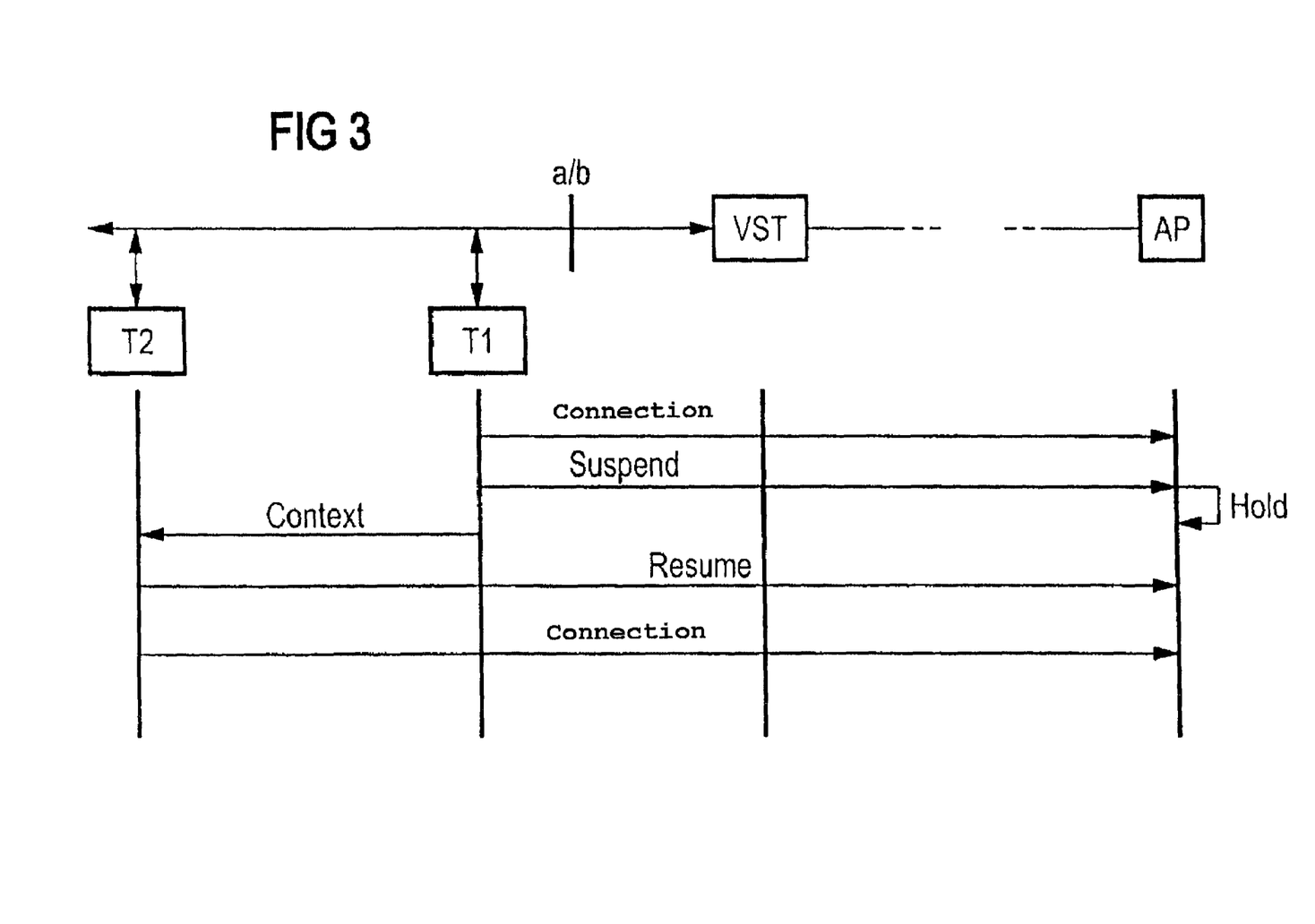
FIG. 3 shows a flow diagram of the method according to the invention in which the subscriber terminals are connected in parallel to an a/b line of an analog subscriber line.

FIG. 3 describes the method according to the invention for an analog subscriber line in which the subscriber terminals T1 and T2 are connected in parallel to the switching center VST via a so-called a/b connection. Initially there is a connection between the subscriber terminal T1 and the access computer AP. The subscriber terminal T1 signals the switching center VST to suspend data transmission with a message Suspend, which is forwarded to the access computer AP and puts the latter into the aforesaid Hold state. The message Suspend may be transmitted, for example, by means of DMTF (Dual Tone Multifrequency) tones or MFC (Multifrequency Code). After receiving the message Suspend, the switching center suspends the data transmission between the access computer and the subscriber terminal T1 on the physical layer. In the Hold state, the access computer maintains the logical link, even if physically no data can be exchanged between the access computer and the subscriber terminal T1. Data can then be sent between the subscriber terminals T1 and T2. While data transmission is suspended, the switching center monitors the subscriber line connected to the network termination for the arrival of a message Resume.

After suspension of data transmission, the subscriber terminal T1 sends a message Context concerning the communication state of the existing logical link to the subscriber terminal T2. The message can be transmitted for example using FSK (Frequency Shift Keying). The subscriber terminal T2 adapts its own state—as already described above—to the reported communication state. If necessary, resynchronization must be performed for the subscriber-side and network-side data communication equipment, e.g. modems, participating in the data link.

In contrast to the method described for an ISDN subscriber line, the subscriber terminal T2 assumes the switched connection to the access computer AP. It is therefore unnecessary to physically establish a connection or establish a new connection. By sending a message Resume to the access computer, the subscriber terminal T2 then initiates resumption of data transmission. The connection is transferred in that the subscriber terminal T2 picks up the connection and the subscriber terminal T1 hangs up. Once the described transfer procedure has been completed, a connection exists between the subscriber terminal T2 and the access computer AP via the switching center VST.

Figure 4:
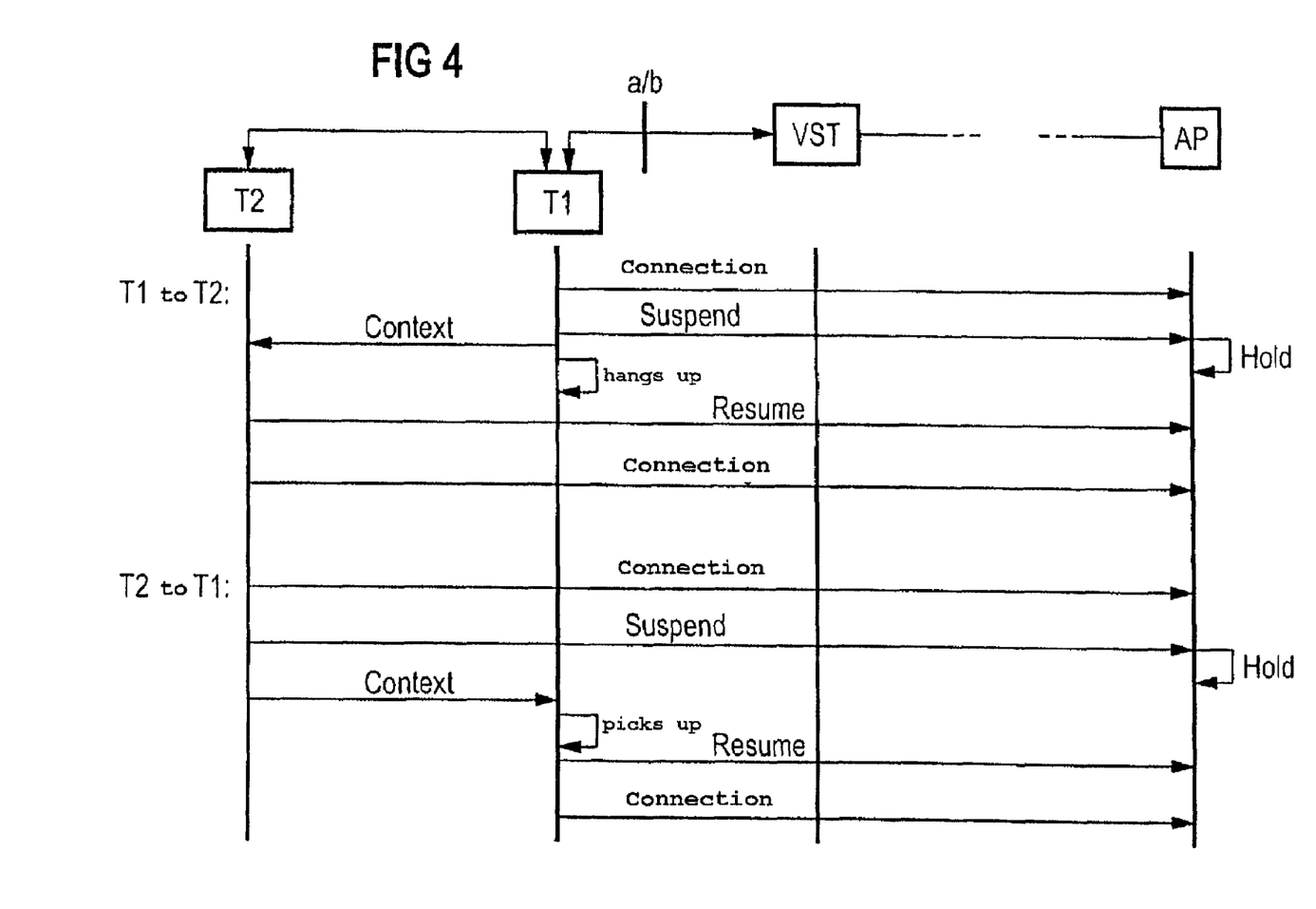
FIG. 4 shows a flow diagram in which the subscriber terminals are connected in series to an a/b line of an analog subscriber line.

FIG. 4 shows an analog subscriber line in which the subscriber terminals T2 and T1 are connected in series. Accordingly, a distinction must be drawn between two cases:

In the first case the subscriber terminal T1 transfers the existing logical data link to the subscriber terminal T2. In the second case the subscriber terminal T2 transfers the existing logical data link to the subscriber terminal T1.

In the first case, a connection initially exists between the subscriber terminal T1 and the access computer AP. The subscriber terminal T1 sends a message Suspend to the access computer, whereby the latter is put in the Hold state. The subscriber terminal T1 then passes a message Context concerning the communication state to the subscriber terminal T2. Following this the subscriber terminal T2 adapts its own state to the communication state and assumes the switched connection, in that it picks up the connection and the subscriber terminal T1 hangs up. A resynchronization of the subscriber-side or network-side data communication equipment, e.g. modems, may be necessary. Following this the subscriber terminal T2 transmits the message Resume to the access computer to initiate the resumption of data transmission. Once the transfer procedure has been completed, a connection exists between the subscriber terminal T2 and the access computer AP via the switching center VST.

According to a variation of the method described above, it is possible here to omit the sending of the message Suspend, the suspension of data transmission and the Hold state of the access computer AP to maintain the logical data link. Since the subscriber terminals T1 and T2 are directly connected to one another, they can also communicate directly with one another. That is, the subscriber terminal T1 need only "hang up" and the subscriber terminal T2 "picks up" once it has adapted its state to the reported communication state.

The method for transferring the existing logical data link from the subscriber terminal T2 to the subscriber terminal T1 according to the second case mentioned is analogous to the method described with reference to FIG. 3. To transfer the data link, the subscriber terminal T1 picks up the existing connection to the access computer and the subscriber terminal T2 hangs up.

Figure 5:
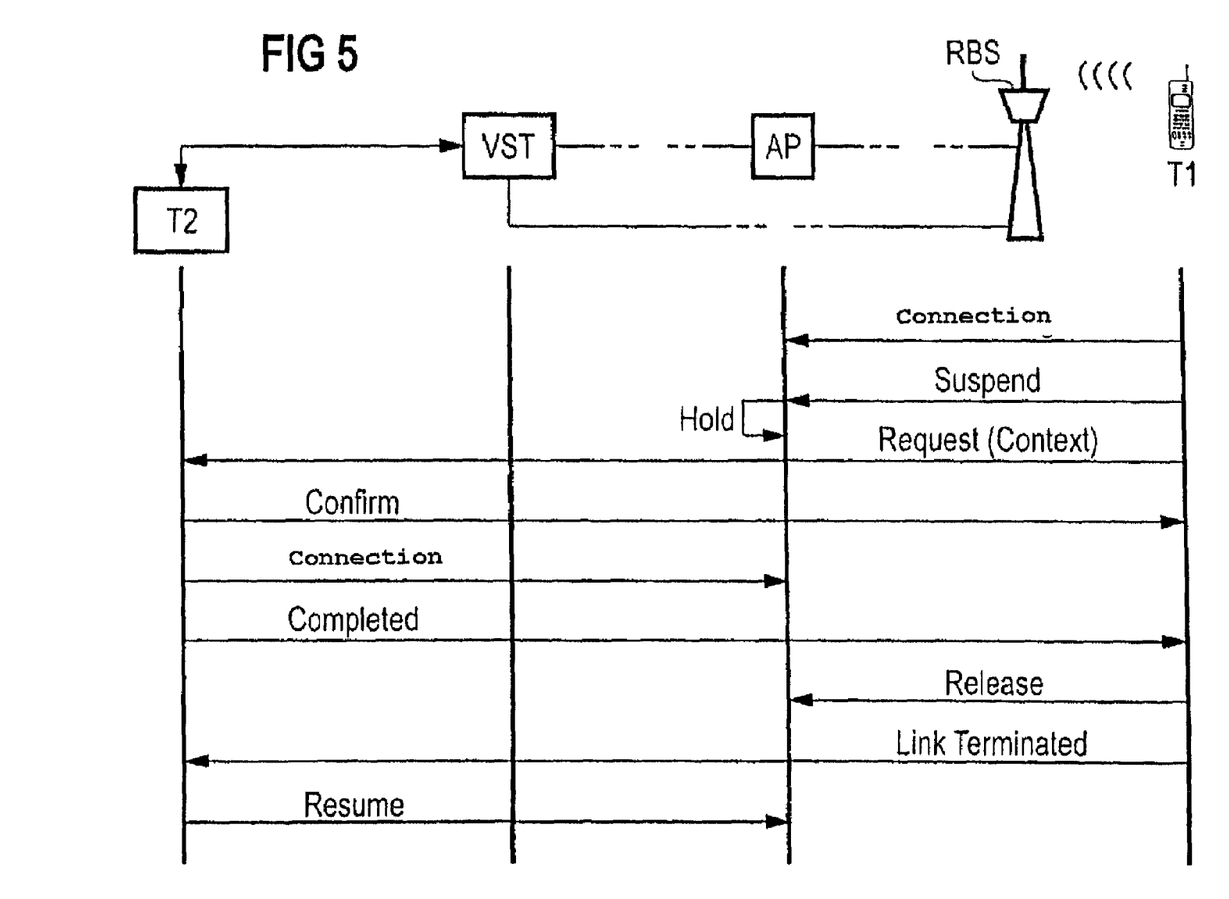
FIG. 5 shows a flow diagram in which the first subscriber terminal represents a mobile station of the mobile network and the second subscriber terminal belongs to an ISDN or analog subscriber line of the fixed network.

FIG. 5 shows the case where the telecommunications network comprises a fixed network and a mobile network. In this case the subscriber terminal T2 of an ISDN or analog subscriber line is connected to the switching center VST, which has a connection to the access computer AP of the data network. In addition, the switching center VST, as illustrated in FIG. 1, is connected via the telephone network and a mobile network to a radio device RBS that has a radio link to the subscriber terminal T1, e.g. a mobile station. The broken lines shown in FIG. 5 indicate connections between the network elements VST, AP and RBS, for example according to those illustrated in FIG. 1.

Initially a connection exists, for example, between the subscriber terminal T1 and the access computer AP. The same signaling messages are then exchanged as described with reference to the other figures. That is, the subscriber terminal T1 sends a message Suspend to the access computer AP, which puts the latter into the suspended state Hold. The subscriber terminal T1 then sends a request message Request including the communication state Context to transfer the existing logical data link to the subscriber terminal T2. Once the access computer has received the message Resume from the subscriber terminal T2, it resumes data transmission. The method described can also be used for transferring the existing data link to the access computer from the subscriber terminal T2 to the mobile station T1. The difference from the methods described in FIGS. 2 to 4 is essentially that the signaling messages, e.g. Request, are transported over the entire telecommunications network.

According to another variation of the described procedure, a laptop, for example, is connected via a serial interface to the mobile station T1 shown in FIG. 5. The previously existing connection between the mobile station T1 and the access computer AP is thus passed on to the laptop. This method ultimately corresponds to the sequence illustrated in FIG. 4. The subscriber terminal T1 in FIG. 4 should be thought of as a mobile station and the subscriber terminal T2 as a laptop.

It applies to the methods described above that, once completed, the transferred logical data link to the subscriber terminal T2 can be transferred back to the subscriber terminal T1 again in the same way.

The method according to the invention has a further application in the case where a so-called always-on connection exists between a subscriber terminal, e.g. T1, and the access computer AP. An always-on connection means a permanent narrowband data link from the subscriber terminal to the access computer AP. For ISDN subscriber lines such a narrowband connection is made available through the provision of a certain amount of bandwidth on the D-channel. With an analog subscriber line, the so-called on-hook data transmission method in accordance with the ETS 300 659-1 standard can be utilized for a permanent connection of this type.

Returning to FIG. 2, it should be imagined that a subscriber terminal T1 has such a permanent connection to the access computer AP. The subscriber terminal, e.g. a telephone with display, receives electronic mail over this permanent connection. The subscriber would then like to read the electronic mail on his personal computer T2 for example. The method for transferring the existing logical data link between the subscriber terminal T1 and the access computer AP then proceeds in the same way as described in FIG. 2. To take over the existing data link, a new connection is switched between the subscriber terminal T2 and the access computer AP. Once connection establishment and adaptation of its own state to the reported communication state have been successfully completed, however, the existing permanent narrowband connection between the subscriber terminal T1 and the access computer AP is not cleared. The access computer need only be notified that all data will be sent to the subscriber terminal T2 for as long as the connection to the subscriber terminal T2 exists. On termination of the connection with the subscriber terminal T2, the data are again transmitted to the subscriber terminal T1 over the permanent connection.

What is claimed is:

1. A method for the transfer of an existing logical data link between a first subscriber terminal and a second subscriber terminal in a telecommunications network, comprising:
    connecting the first subscriber terminal to a subscriber line of the telecommunications network, and connecting a switching center of the telecommunications network from the first subscriber terminal to the second subscriber terminal, the second subscriber terminal connected to the subscriber line of the first subscriber terminal or to another subscriber line of the telecommunications network;
    receiving a message at the second subscriber terminal sent from the first subscriber terminal and providing the communication state of an existing logical data link and assuming the logical data link in the communication state.

2. The method as claimed in claim 1, wherein the telecommunications network comprises at least one fixed network and/or at least one mobile network.

3. The method as claimed in claim 1, further comprising: exchanging messages between the first subscriber terminal and the second subscriber terminal each belonging to a digital subscriber line, such that one of the subscriber terminals sends a message addressed to the other terminal to a network termination of the subscriber line, and the other terminal sends the message to the other subscriber terminal and to a switching center.

4. The method as claimed in claim 1, further comprising: transferring the logical data link from a first analog subscriber terminal to a second analog subscriber terminal which is connected to the analog subscriber line of the first subscriber terminal and, when the logical data link is assumed by the second subscriber terminal, the connection previously established by the first subscriber terminal between the subscriber line and the switching center is maintained.

5. The method as claimed in claim 1, wherein after transmission of the message of the communication state, a suspension of data transmission on the logical data link is initiated by the first subscriber terminal and, after the logical data link has been transferred, data transmission is resumed and is initiated by the second subscriber terminal.

6. The method as claimed in claim 5, wherein the logical link between the switching center and the subscriber terminal is maintained during the suspension phase.

7. The method as claimed in claim 1, wherein the message about the communication state includes an assigned data network address of at least one of the first subscriber terminal, information about transmission bandwidth, information about a reserved quality, authorization information, application settings information, information about a state of applications activated in the first subscriber terminal and synchronization information for one or more data communication devices present in the subscriber terminal.

* * * * *